Patented Oct. 14, 1941

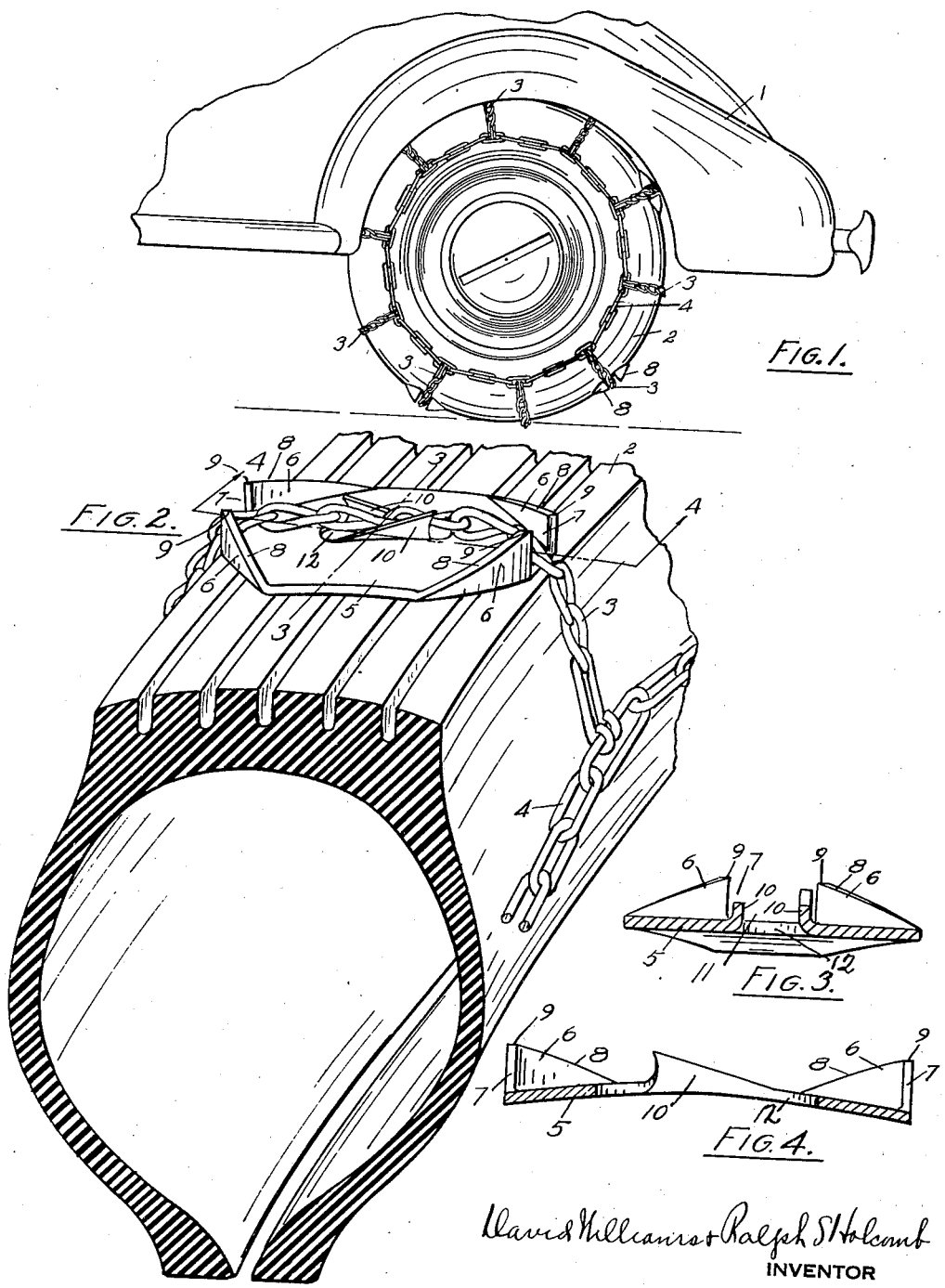

2,259,189

UNITED STATES PATENT OFFICE 2,259,189

NONSKID ATTACHMENT

David Williams and Ralph S. Holcomb, Warren, Pa.

Application January 20, 1940, Serial No. 314,802

3 Claims. (Cl. 152—224)

This invention is intended to supplement non-skid chains in preventing skidding, and while the devices add traction, they are particularly desirable in preventing side skidding.

In carrying out the invention, non-skid plates, readily attachable through the action of the cross chains, are supplied and can be readily applied to any standard chains. Features and details of the invention will appear from the specification and claims.

A preferred embodiment of the invention is illustrated in the accompanying drawing as follows:

Fig. 1 shows an elevation of an automobile having chains placed on one of its wheels.

Fig. 2 a perspective view of an enlarged portion of a tire showing the attachment in place.

Fig. 3 a section on the line 3—3 in Fig. 2.

Fig. 4 a section on the line 4—4 in Fig. 2.

1 marks an automobile; 2 a tire mounted on one of the wheels; 3 cross chains arranged over the tire; and 4 the usual circumferential chains from which the cross chains extend.

The attachment consists of a plate 5. Flanges 6 are bent up at the corners of the plate, the inner edges of these flanges being spaced forming slots 7 for receiving the cross chain and thus holding the plate in place. The adjacent flanges, it will be noted, are arranged in pairs, one pair at each side of the fore and aft center line of the plate. The flanges 6 as they are bent up form inclined surfaces 8 leading to points 9, which points were originally the corners of the plate. The plate is slightly concave at the side opposite the flange side so as to conform more or less to the cross curvature of a tire. With this arrangement the fore and aft edges of the plate are close to the tire face throughout and the incline starting from this edge brings the points into action without an abrupt jolt which causes unpleasant jar in the automobile.

It will readily be seen that these plates may be attached to any standard chain and are securely fastened on the tire as the chains are locked in place.

The flanges not only guide or secure the chain in place, but also form non-skid plates or faces. These faces extend partially longitudinally and thus present laterally faced abutments which, engaging the ground surface or ice surface, prevents skidding. The points assure the penetration of the flanges and the inclined surfaces provide easing of the lifting of the tire. The points as they are arranged tend to sharpen themselves in use.

Preferably opposing flanges 10 are struck up in the body of the plate forming a groove or channel 11 which provides an extra guide for the chain. The flanges add to the traction of the chains and the opening through the plate at 12 formed by striking up the flanges permits the chain to nest in the plate and thus saves the cross chain somewhat from wear.

Any number of these plates may be used as desired, depending upon the severity of conditions. A few of them are very effective under ordinary conditions but as the conditions grow worse, more plates may be inserted to take care of these conditions.

What we claim as new is:

1. A non-skid attachment comprising an elongated plate providing four corners, said corners projecting upwardly forming flanges extending diagonally across the corners with adjacent corners arranged in pairs, one pair at each side of the fore and aft center line of the plate, the adjacent edges of the flanges being spaced to form a cross chain receiving opening.

2. A non-skid attachment comprising an elongated plate providing four corners, said corners projecting upwardly forming flanges extending diagonally across the corners with adjacent corners arranged in pairs, one pair at each side of the fore and aft center line of the plate, the adjacent edges of the flanges being spaced to form a cross chain receiving opening, the flanges being inclined from the fore and aft edges of the plate to a point adjacent to the chain receiving opening.

3. A non-skid attachment comprising an elongated plate providing four corners, said corners projecting upwardly forming flanges extending diagonally across the corners with adjacent corners arranged in pairs, one pair at each side of the fore and aft center line of the plate, the adjacent edges of the flanges being spaced to form a cross chain receiving opening, the flanges being inclined from the fore and aft edges of the plate to a point adjacent to the chain receiving opening, the face of the plate opposite the flange side thereof being curved crosswise of the plate.

DAVID WILLIAMS.
RALPH S. HOLCOMB.